(12) United States Patent
Baba

(10) Patent No.: US 10,291,519 B2
(45) Date of Patent: May 14, 2019

(54) COMMUNICATION DEVICE AND COMMUNICATION METHOD

(71) Applicant: NEC Corporation, Minato-ku, Tokyo (JP)

(72) Inventor: Kiyoshi Baba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 71 days.

(21) Appl. No.: 15/273,987

(22) Filed: Sep. 23, 2016

(65) Prior Publication Data

US 2017/0134272 A1    May 11, 2017

(30) Foreign Application Priority Data

Nov. 9, 2015  (JP) .................................. 2015-219190

(51) Int. Cl.
*H04L 12/26* (2006.01)
*H04L 12/721* (2013.01)
*H04L 12/803* (2013.01)

(52) U.S. Cl.
CPC .............. *H04L 45/70* (2013.01); *H04L 43/08* (2013.01); *H04L 47/125* (2013.01)

(58) Field of Classification Search
CPC .............................. H04L 45/70; H04L 47/125
See application file for complete search history.

(56) References Cited

U.S. PATENT DOCUMENTS

| | | | |
|---|---|---|---|
| 8,233,483 | B2 | 7/2012 | Enomoto et al. |
| 2002/0150114 | A1* | 10/2002 | Sainomoto .............. H04L 45/00 370/402 |
| 2005/0243725 | A1* | 11/2005 | Wrenn ..................... H04L 69/40 370/238 |
| 2009/0046583 | A1* | 2/2009 | Towster .............. H04L 41/0896 370/232 |
| 2009/0059928 | A1 | 3/2009 | Enomoto et al. |

(Continued)

FOREIGN PATENT DOCUMENTS

| | | |
|---|---|---|
| JP | H11-008646 A | 1/1999 |
| JP | 2007-060494 A | 3/2007 |

(Continued)

OTHER PUBLICATIONS

Japanese Office Action for JP Application No. 2015-219190 dated Jan. 10, 2017 with English Translation.

*Primary Examiner* — Gary Mui

(57) ABSTRACT

A communication device is made to be of a structure including a communication unit, a routing information generation unit, a load monitoring unit and a communication control unit. The communication unit sends and receives data via a plurality of ports connected to a network having a plurality of communication routes. The routing information generation unit acquires information on a communication route based on correspondence between a port and each port of a connection destination. The load monitoring unit monitors a load state for each communication route. The communication control unit selects a communication route to transmit a packet based on a monitoring result of the load state, adds information on an address based on the selected communication route to the packet, and outputs the packet to a port corresponding to the selected communication route.

13 Claims, 14 Drawing Sheets

(56) References Cited

U.S. PATENT DOCUMENTS

| | | | |
|---|---|---|---|
| 2009/0238188 A1* | 9/2009 | Xu | H04L 45/04 370/392 |
| 2010/0182920 A1* | 7/2010 | Matsuoka | H04L 43/00 370/252 |
| 2013/0195109 A1* | 8/2013 | Ogawa | H04L 63/0281 370/392 |
| 2015/0006705 A1* | 1/2015 | Antony | H04L 43/0882 709/224 |
| 2015/0156116 A1* | 6/2015 | Liu | H04L 47/125 370/237 |
| 2015/0334057 A1* | 11/2015 | Gao | H04L 49/351 370/392 |
| 2016/0164781 A1* | 6/2016 | Imai | H04L 45/125 370/252 |

FOREIGN PATENT DOCUMENTS

| | | |
|---|---|---|
| JP | 2009-055419 A | 3/2009 |
| JP | 2015-050527 A | 3/2015 |

* cited by examiner

Fig.12

BAND INFORMATION OF TRANSMITTING DEVICE

| OWN PORTS | CONNECTION DESTINATION PORTS | |
|---|---|---|
| | B0 | B1 |
| A0 | ○ | ○ |
| A1 | ○ | ○ |

BAND INFORMATION OF TRANSMITTING DEVICE

| OWN PORTS | | CONNECTION DESTINATION PORTS | CONNECTION DESTINATION PORTS |
|---|---|---|---|
| | | B0 | B1 |
| A0 | TRANSMISSION BAND | 10Gbps | 0Gbps |
| | NW BAND | 40Gbps | 25Gbps |
| | SURPLUS BAND | 30Gbps | 25Gbps |
| A1 | TRANSMISSION BAND | 0Gbps | 0Gbps |
| | NNW BAND | 10Gbps | 20Gbps |
| | SURPLUS BAND | 10Gbps | 20Gbps |

Fig.13

ROUTING INFORMATION OF TRANSMITTING DEVICE

| OWN PORTS | CONNECTION DESTINATION PORTS | |
|---|---|---|
| | B0 | B1 |
| A0 | ○ | × |
| A1 | ○ | ○ |

BAND INFORMATION OF TRANSMITTING DEVICE

| OWN PORTS | | CONNECTION DESTINATION PORTS | |
|---|---|---|---|
| | | B0 | B1 |
| A0 | TRANSMISSION BAND | 30Gbps | 0Gbps |
| | NW BAND | 40Gbps | 25Gbps |
| | SURPLUS BAND | 10Gbps | 25Gbps |
| A1 | TRANSMISSION BAND | 0Gbps | 0Gbps |
| | NW BAND | 10Gbps | 20Gbps |
| | SURPLUS BAND | 10Gbps | 20Gbps |

Fig.14

ROUTING INFORMATION OF TRANSMITTING DEVICE

| OWN PORTS | CONNECTION DESTINATION PORTS | |
|---|---|---|
| | B0 | B1 |
| A0 | ○ | × |
| A1 | ○ | ○ |

BAND INFORMATION OF TRANSMITTING DEVICE

| OWN PORTS | | CONNECTION DESTINATION PORTS | CONNECTION DESTINATION PORTS |
|---|---|---|---|
| | | B0 | B1 |
| A0 | TRANSMISSION BAND | 20Gbps | 0Gbps |
| | NW BAND | 40Gbps | 25Gbps |
| | SURPLUS BAND | 20Gbps | 25Gbps |
| A1 | TRANSMISSION BAND | 0Gbps | 20Gbps |
| | NW BAND | 10Gbps | 20Gbps |
| | SURPLUS BAND | 10Gbps | 0Gbps |

COMMUNICATION DEVICE AND COMMUNICATION METHOD

This application is based upon and claims the benefit of priority from Japanese Patent Application No. 2015-219190, filed on Dec. 9, 2015, the disclosure of which is incorporated herein in its entirety by reference.

TECHNICAL FIELD

The present invention relates to a communication device, and, more particularly, to a communication device which communicates via a plurality of ports.

BACKGROUND ART

There is a case in which, for the purpose of coping with such as increase of a data transmission volume and improvement of redundancy to enhance availability, a communication system having a communication device connected to a network via a plurality of ports is used. In a communication system which performs communication using a plurality of communication routes on a network, it is desirable that, when load increase or a failure occurs in a communication route, a time needed for switching of ports of a communication device be suppressed as much as possible to improve availability or to reduce delay. It is also desirable that a communication route can be selected appropriately according to a load of a network and available communication routes.

There is a case where a communication device connected to a network by a plurality of ports has a load balancer function for conducting data transmission in a distributed manner among each port. However, even when conducting communication while making a plurality of communication routes share a load, a loss of a packet and delay of transmission can be caused if a communication route is not selected appropriately. It is necessary to suppress a loss of a packet and delay of transmission as much as possible because they deteriorate quality of communication. Therefore, development of technologies which suppress, in a communication system which performs communication via a plurality of communication routes, a loss of a packet and delay of transmission while sharing a load has been made. As a technology which suppresses a loss of a packet and delay of transmission while sharing a load in a communication system communicating via such a plurality of communication routes, the technology of patent document 1 (Japanese Patent Application Laid-Open No. 2009-55419), for example, has been disclosed.

Patent document 1 relates to a communication system in which a transmitting device and a receiving device communicate via a plurality of networks. A transmitting device and a receiving device of a communication system of patent document 1 are connected with each other via a plurality of networks. In a communication system of patent document 1, a plurality of ports of a transmitting device and a plurality of ports of a receiving device correspond to each other in one-on-one, respectively, and are connected to each network. A transmitting device of patent document 1 shares a load and performs communication by assigning a packet to be transmitted to each port in turn.

A receiving device of patent document 1 detects a loss of packets received via each port by monitoring packets held in a buffer provided for each port based on a sequence number. When a packet loss is detected, a receiving device of patent document 1 requests a communication device to retransmit a packet. In patent document 1, it is supposed that, by having such structure, influence of a packet loss in a communication system which shares a load and communicates by a plurality of routes can be suppressed.

However, the technology of patent document 1 is not sufficient in the following point. In a communication system of patent document 1, ports of a transmitting device and a receiving device are combined fixedly in one-on-one, respectively. In addition, each pair of ports corresponds to different networks, respectively. Therefore, the technology of patent document 1 cannot handle a case in which, in a communication system equipped with a communication device connected to a single network via a plurality of ports, a route is reorganized at the time of a failure and the like. Furthermore, because, in patent document 1, packets to be transmitted are allocated to each port in turn, packets are allocated even to a network of a heavy load. Therefore, in a communication system of patent document 1, there is a fear that delay occurs in transmission of a packet. Therefore, the patent document 1 is not enough as a technology for suppressing a loss of a packet and delay of transmission while sharing a load in a communication system which communicates via a plurality of routes.

SUMMARY

One example of an object of the present invention is to provide a communication device which can suppress, in communication using a plurality of communication routes, a loss of a packet and delay of a transmission while sharing a load.

A communication device of the present invention includes a communication unit, a routing information generation unit, a load monitoring unit and a communication control unit. The communication unit sends and receives data via a plurality of ports connected to a single network. The routing information generation unit generates information on communication routes based on correspondence between a predetermined port among the plurality of ports and a predetermined port among a plurality of ports provided in a communication device of a connection destination. The load monitoring unit monitors a load state for each communication route. The communication control unit selects from the plurality of communication routes a communication route to transmit a packet based on a monitoring result of a load state, adds information on an address to the packet based on the selected communication route, and outputs the packet to a port corresponding to the selected communication route.

Based on correspondence between a predetermined port among a plurality of ports connected to a single network having a plurality of communication routes and a predetermined port among a plurality of ports provided in a communication device of a connection destination, the communication method of the present invention generates information on communication routes. The communication method of the present invention monitors a load state for each communication route. Based on a monitoring result of a load state, the communication method of the present invention selects from the plurality of communication routes a communication route to transmit a packet, adds information on an address to the packet based on the selected communication route, and outputs the packet to a port corresponding to the selected communication route. The communication method of the present invention transmits the packet to the network from the port.

BRIEF DESCRIPTION OF THE DRAWINGS

Exemplary features and advantages of the present invention will become apparent from the following detailed description when taken with the accompanying drawings in which:

FIG. 12 is a diagram showing an example of routing information and band information in the second exemplary embodiment of the present invention;

FIG. 13 is a diagram showing an example of a change in routing information and band information in the second exemplary embodiment of the present invention; and FIG. 14 is a diagram showing an example of a change in routing information and band information in the second exemplary embodiment of the present invention.

EXEMPLARY EMBODIMENT (First Exemplary Embodiment)

Figure 1:
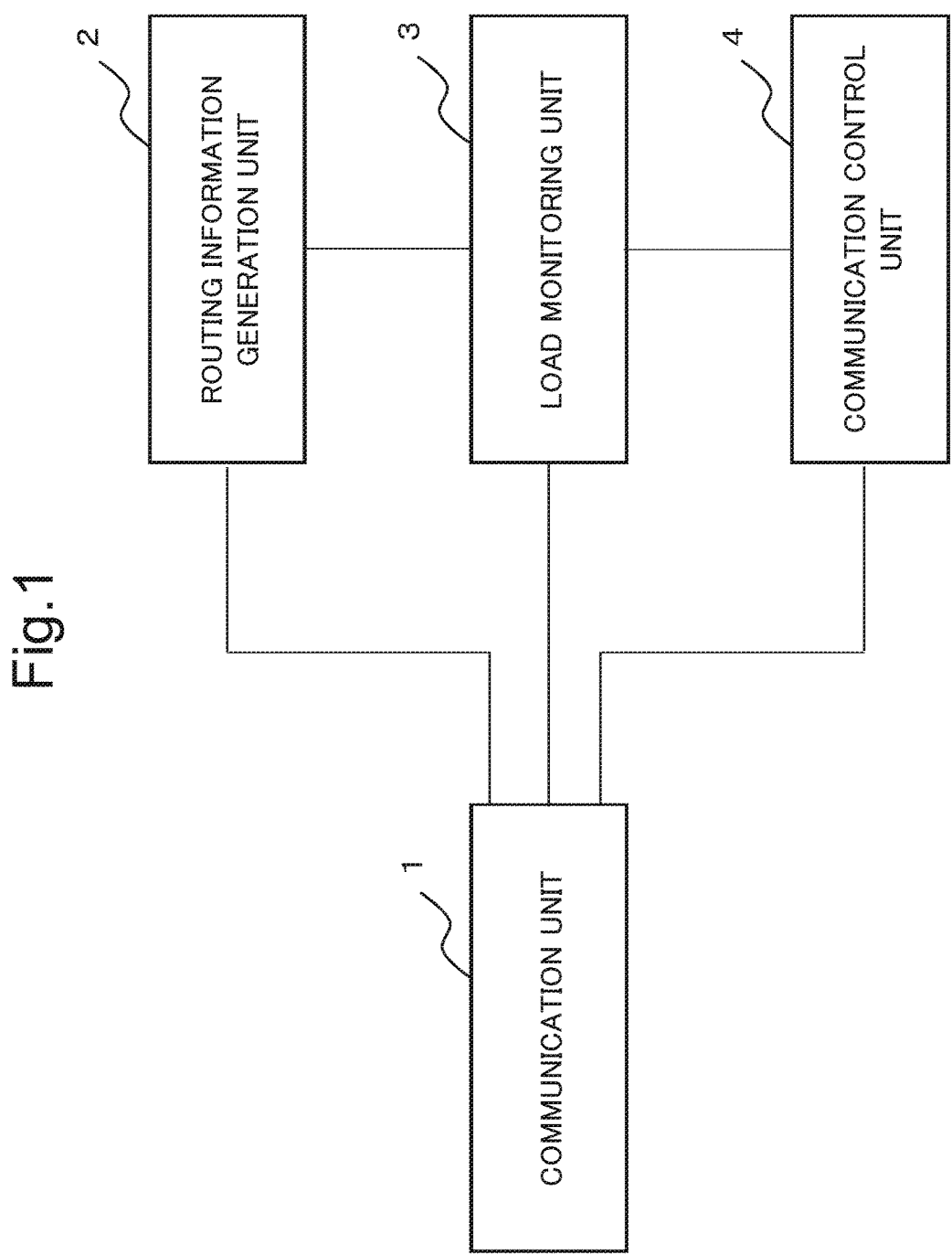
FIG. 1 is a diagram showing an outline of a structure of a first exemplary embodiment of the present invention.

The first exemplary embodiment of the present invention will be described in detail with reference to drawings. FIG. 1 indicates an outline of a structure of a communication device of this exemplary embodiment. A communication device of this exemplary embodiment includes a communication unit 1, a routing information generation unit 2, a load monitoring unit 3 and a communication control unit 4. The communication unit 1 sends and receives data via a plurality of ports connected to a single network having a plurality of communication routes. The routing information generation unit 2 generates information on a communication route based on correspondence between a predetermined port in a plurality of ports and a predetermined port in a plurality of ports provided in a communication device of a connection destination. The load monitoring unit 3 monitors a load state for each communication route. The communication control unit 4 selects from a plurality of communication routes a communication route to transmit a packet based on a monitoring result of a load state, adds information on an address to the packet based on the selected communication route, and outputs the packet to a port corresponding to the selected communication route.

A communication device of this exemplary embodiment acquires information on a plurality of communication routes in the routing information generation unit 2, and monitors a load state for each communication route in the load monitoring unit 3. In a communication device of this exemplary embodiment, the communication control unit 4 selects a communication route to transmit a packet based on information on communication routes and a load state, and the packet is transmitted from a corresponding port. Therefore, a communication device of this exemplary embodiment can select an appropriate communication route and perform load sharing by selecting a communication route to transmit a packet based on information on communication routes and on load information for each communication route. In addition, when a failure or increase of a load occurs on a communication route, a communication device of this exemplary embodiment can select another communication route to perform communication, and, therefore, can suppress a loss of a packet and delay of transmission. As a result, in communication using a plurality of communication routes, a communication device of this exemplary embodiment can suppress a loss of a packet and delay of transmission while sharing a load.

(Second Exemplary Embodiment)

Figure 2:
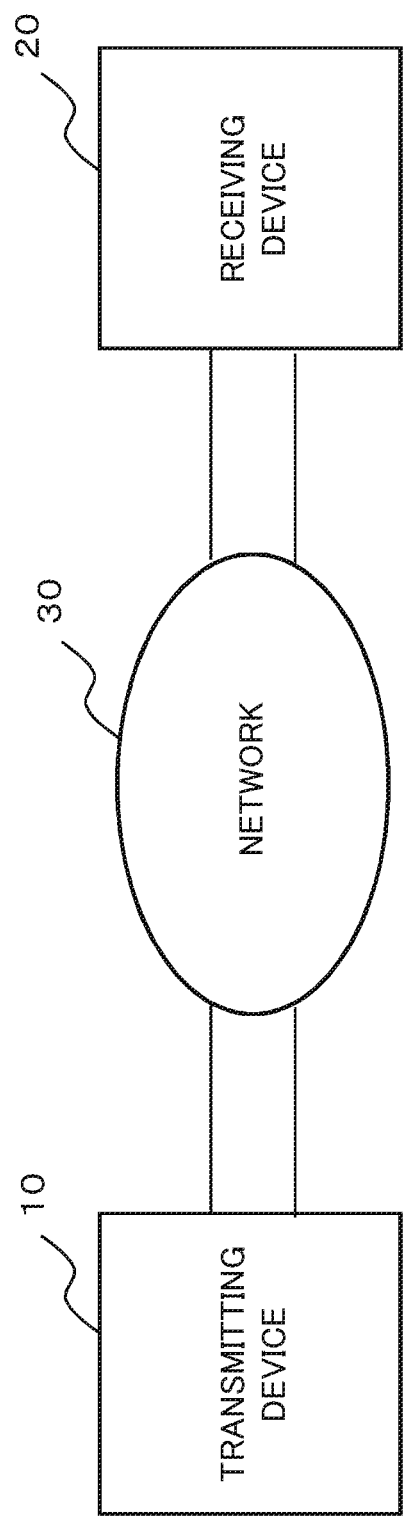
FIG. 2 is a diagram showing an outline of a structure of a second exemplary embodiment of the present invention.

The second exemplary embodiment of the present invention will be described in detail with reference to drawings. FIG. 2 indicates an outline of a structure of a communication system of this exemplary embodiment. A communication system of this exemplary embodiment includes a transmitting device 10 and a receiving device 20. The transmitting device 10 and the receiving device 20 are connected via a network 30. A communication system of this exemplary embodiment is a network system in which data is transmitted from the transmitting device 10 to the receiving device 20 via the network 30 including a plurality of communication routes.

Figure 3:
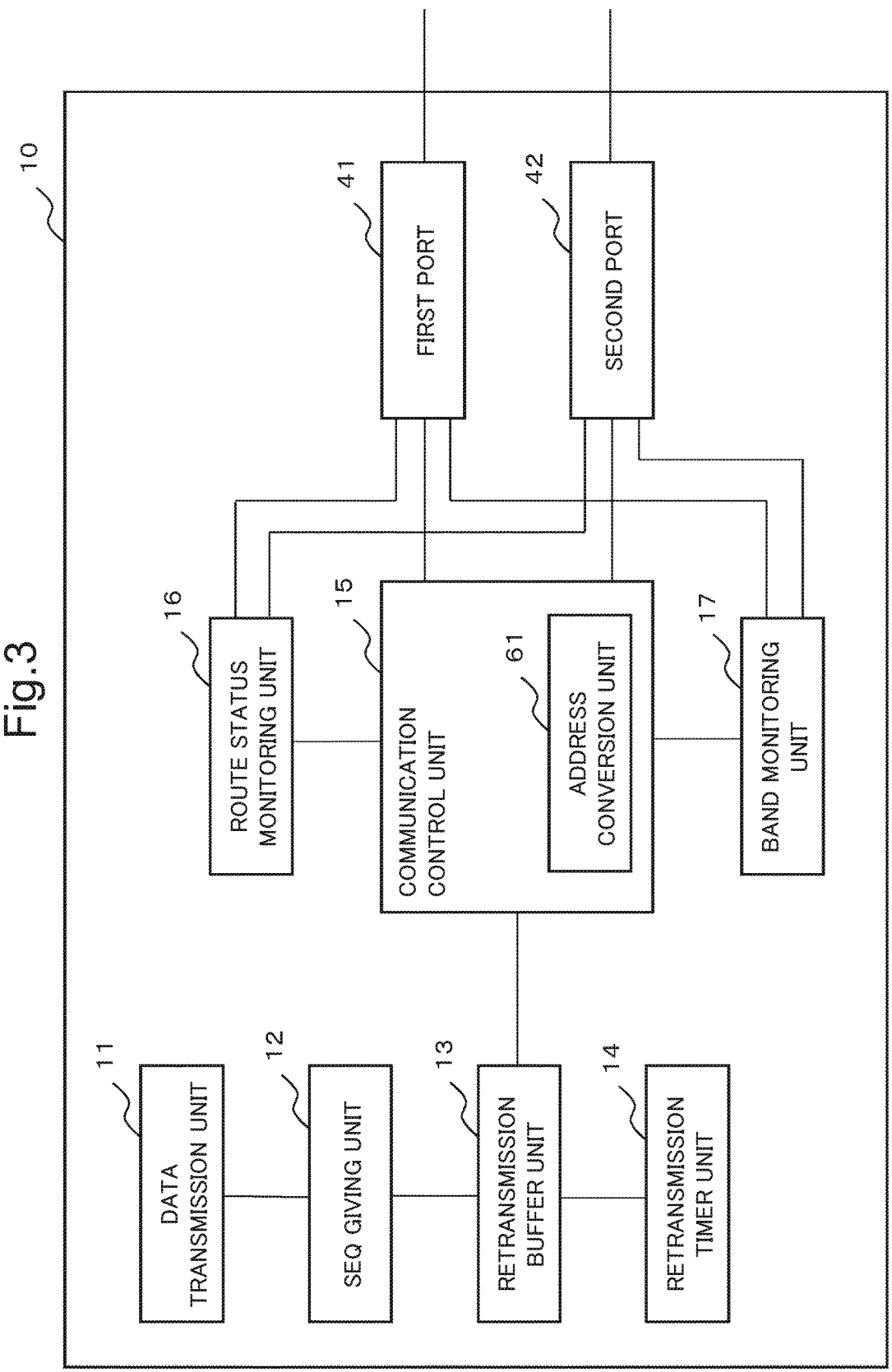
FIG. 3 is a diagram showing an outline of a structure of a transmitting device of the second exemplary embodiment of the present invention.

FIG. 3 indicates an outline of a structure of the transmitting device 10 of this exemplary embodiment. The transmitting device 10 includes a data transmission unit 11, a SEQ (sequence) giving unit 12, a retransmission buffer unit 13, a retransmission timer unit 14, a communication control unit 15, a route status monitoring unit 16, a band monitoring unit 17, a first port 41, and a second port 42. The communication control unit 15 is further equipped with an address conversion unit 61.

The data transmission unit 11 has a function to generate data to be transmitted to the receiving device 20. The data transmission unit 11 generates data to be transmitted to the receiving device 20, and sends the generated data to the SEQ giving unit 12. For example, the data transmission unit 11 corresponds to an execution unit of an application program in a server.

The SEQ giving unit 12 has a function to generate a packet to be transmitted to the receiving device 20. The SEQ giving unit 12 divides data sent from the data transmission unit 11 into packets of a predetermined size for transmitting by the network 30. The SEQ giving unit 12 adds, to a packet which has been generated by dividing the data, information on an address and a sequence number that are required for transmission of the packet. For example, the SEQ giving unit 12 adds MAC (Media Access Control) addresses corresponding to any one of the ports of the receiving device 20 to be a destination and any one of the ports of the transmitting device to be the transmission source to the header of the packet as addresses of the transmission destination and the transmission source. When information of such as a header is added, the SEQ giving unit 12 sends the packet to which information of such as a header is added to the retransmission buffer unit 13. A MAC address added by the SEQ giving unit 12 may be dummy address information.

The retransmission buffer unit 13 possesses a function to store the data of a packet transmitted from the SEQ giving unit 12 and output it to the communication control unit 15 at predetermined timing. When the data of a packet is sent from the SEQ giving unit 12, the retransmission buffer unit 13 stores the sent data. The retransmission buffer unit 13 outputs a copy of the data of a packet stored at a predetermined rate or in units of a predetermined number of packets to the communication control unit 15. After the copy of the data of the first packet among the packets made by dividing a series of pieces of data is outputted, the retransmission buffer unit 13 makes operations of the retransmission timer unit 14 start. The retransmission buffer unit 13 outputs packets to the communication control unit 15 sequentially starting from the packet stored first. That is, the retransmission buffer unit 13 operates as a FIFO (First In, First Out) buffer.

The retransmission buffer unit 13 erases the data of packets of a sequence number smaller than the sequence number indicated in a transmittal confirmation packet which is sent as an ACK (acknowledge) packet from the receiving device 20. When a retransmission request is received, the retransmission buffer unit 13 outputs a copy of the data of packets of a sequence number equal to or less than the sequence number indicated in the retransmission request to the communication control unit 15.

When information which shows that a predetermined time has passed is received from the retransmission timer unit 14, the retransmission buffer unit 13 determines that retransmission of those is needed and outputs a copy of the data of packets that are being held to the communication control unit 15.

The retransmission timer unit 14 has a function to measure a predetermined time based on control of the retransmission buffer unit 13. When a control signal of starting or resetting measurement of a time is received from the retransmission buffer unit 13, the retransmission timer unit 14 begins to measure a predetermined time. When the predetermined time has passed from the start of measurement, the retransmission timer unit 14 sends a signal which shows that the predetermined time has passed to the retransmission buffer unit 13. A predetermined time is set such that it is longer than an interval until the receiving device 20 transmits an ACK packet that is received from the receiving device 20 as notification of transmittal confirmation of a packet. A predetermined time is set in advance based on a transmission interval of an ACK packet.

The communication control unit 15 has a function to allocate packets which are sent from the retransmission buffer unit 13 to each port. The communication control unit 15 selects a communication route which is used for transmission of a packet based on routing information and a result of monitoring of a load state of the network 30, the monitoring being performed by the band monitoring unit 17. The communication control unit 15 allocates a packet to a port corresponding to the selected communication route. On the occasion of allocating a packet, the communication control unit 15 rewrites, in the address conversion unit 61, information of the addresses of the transmission source and the destination of the packet to addresses corresponding to a port of the transmission source that is the allocated port and a port of the destination based on routing information. The address conversion unit 61 is storing routing information generated by the route status monitoring unit 16. Routing information is information in which a MAC address of a port of a transmission source, a MAC address of a port of the receiving device 20 of a destination, and information on whether or not the communication route is usable is correlated with each other.

The communication control unit 15 outputs packets for which information on an address has been rewritten to ports corresponding to MAC addresses of the transmission source, respectively. The communication control unit 15 of this exemplary embodiment corresponds to the communication control unit 4 of the first exemplary embodiment.

The route status monitoring unit 16 has a function to manage routing information. Based on a packet which is transmitted from the receiving device 20 as a broadcast packet, the route status monitoring unit 16 generates routing information between the MAC address of the receiving device 20 that is the transmission source and a port of its own device which has received the packet, and stores it as a routing information table. In the routing information table, the MAC address of a communication destination, the MAC address of the own device, and information on whether or not a communication route is usable is correlated, and stored as routing information.

With respect to a route which has not received a packet at all and a route which has not received a packet for more than a predetermined time continuously after a packet has been received last time, the route status monitoring unit 16 updates the routing information table as being unusable. When a packet is received once again about a route that has been determined to be unusable once, the route status monitoring unit 16 updates the routing information table as being usable. When the routing information table is updated, the route status monitoring unit 16 sends the updated routing information table to the address conversion unit 61. The route status monitoring unit 16 of this exemplary embodiment corresponds to the routing information generation unit 2 of the first exemplary embodiment.

The band monitoring unit 17 has a function to watch a load state of the network 30. The band monitoring unit 17 monitors a data transmission volume for each combination between a port of the transmitting device 10 and a port of the receiving device 20. The band monitoring unit 17 of this exemplary embodiment monitors a transmission band which can be managed in the side of the transmitting device 10 and a network band which is obtained based on information sent from the receiving device 20. In this exemplary embodiment, a transmission band means a transmission data amount per unit time. A network band means a volume of data that can be transmitted per unit time. For example, a network band is set as a maximum value of a volume of data per unit time for which transmission has completed. The initial value of a network band is set within a range that does not exceed the link speed of the transmitting device 10.

The band monitoring unit 17 generates information on a transmission band by monitoring a data volume of packets transmitted from the first port 41 and the second port 42, and calculating a data volume per unit time, for example. A unit time is set as one second, for example. The band monitoring unit 17 stores a maximum value of data for which transmission has completed within a given period, and makes the numerical value of the maximum value be a network band, for example. For example, the network band can be made to be the maximum value of a data volume of packets for which a transmittal completion notification has been received per unit time. The band monitoring unit 17 may obtain information on a network band based on a volume of data which has been transmitted from the receiving device 20 and received for each communication route. Also, a network band may be measured by sending and receiving test signals between the transmitting device 10 and the receiving device 20.

The band monitoring unit 17 subtracts a transmission band from a network band to calculate a surplus network band. The band monitoring unit 17 generates a data table in which a transmission band, a network band and a surplus network band are correlated with each other in a predetermined time interval as load information, and sends it to the communication control unit 15. Also, it may be such that, when routing information is updated, band information which indicates a load state for each communication route is updated. The band monitoring unit 17 of this exemplary embodiment corresponds to the load monitoring unit 3 of the first exemplary embodiment.

The first port 41 has a function to communicate with the receiving device 20 via the network 30. The first port 41 converts data of a packet sent from the communication control unit 15 into a signal which complies with the communication standard of the network 30, and transmits it to the network 30. The first port 41 converts data received via the network 30 into a signal of a form used inside the transmitting device 10, and sends it to the communication control unit 15.

The second port 42 has a function to communicate with the receiving device 20 via the network 30. The second port 42 converts data of a packet sent from the communication control unit 15 into a signal which complies with the communication standard of the network 30, and transmits it to the network 30. Furthermore, the second port 42 converts data received via the network 30 into a signal of the form used inside the transmitting device 10, and sends it to the communication control unit 15.

The first port 41 and the second port 42 of this exemplary embodiment have MAC addresses of consecutive numbers, respectively. By making the MAC addresses be of consecutive numbers, it becomes possible to facilitate management in a receiving end. Although a character string of 48 bits is usually used for a MAC address, when two MAC addresses of consecutive numbers are used, for example, it becomes possible to identify the transmitting device 10 of a transmission source only by 47 higher rank bits while ignoring one bit that is the lowest rank bit. The MAC addresses of the first port 41 and the second port 42 do not have to be consecutive numbers. When they are not consecutive numbers, it is desirable that there be regularity in the MAC addresses of the first port 41 and the second port 42 in order to make identification in a receiving end easy. The first port 41 and the second port 42 of this exemplary embodiment correspond to the communication unit 1 of the first exemplary embodiment.

Figure 4:
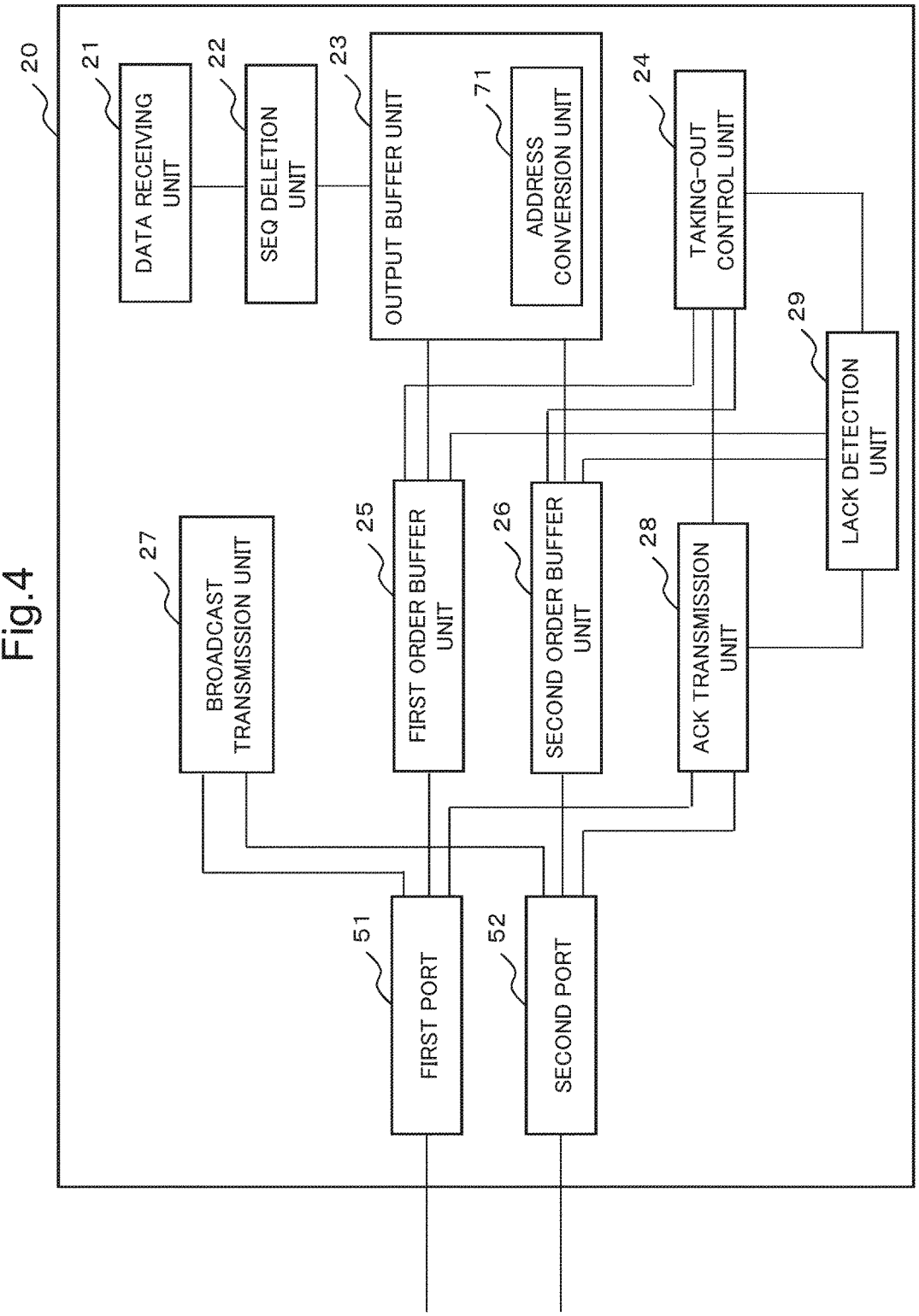
FIG. 4 is a diagram showing an outline of a structure of a receiving device of the second exemplary embodiment of the present invention.

FIG. 4 indicates an outline of a structure of the receiving device 20 of this exemplary embodiment. The receiving device 20 includes a data receiving unit 21, a SEQ deletion unit 22, an output buffer unit 23, a taking-out control unit 24, a first order buffer unit 25 and a second order buffer unit 26. The receiving device 20 further includes a broadcast transmission unit 27, an ACK transmission unit 28 and a lack detection unit 29. The receiving device 20 further includes a first port 51 and a second port 52. The output buffer unit 23 further includes an address conversion unit 71.

The data receiving unit 21 has a function to process data received from the transmitting device 10. The data receiving unit 21 performs each piece of processing based on data inputted from the SEQ deletion unit 22. For example, the data receiving unit 21 corresponds to an execution unit of an application program of an information processing device in the client side.

The SEQ deletion unit 22 has a function to eliminate header information and the like from the data of a packet. The SEQ deletion unit 22 eliminates information such as an address, a sequence number and the like from a packet inputted from the output buffer unit 23. The SEQ deletion unit 22 outputs the data of the packet from which header information and the like has been eliminated to the data receiving unit 21.

The output buffer unit 23 has a function to receive a packet from each order buffer unit, and store the received packet temporarily. The output buffer unit 23 receives packets from the first order buffer unit 25 and the second order buffer unit 26 in order of a sequence number, and stores the received packets temporarily. The output buffer unit 23 outputs stored packets to the SEQ deletion unit 22 in order of storage based on control of the taking-out control unit 24. That is, the output buffer unit 23 operates as a FIFO buffer. The address conversion unit 71 of the output buffer unit 23 converts information on MAC addresses of a transmission source and a transmission destination in the information of the header of a packet stored temporarily. For example, if the MAC addresses of the two ports are consecutive numbers, the address conversion unit 71 of the output buffer unit 23 converts the least significant bit of a MAC address into "0". When the MAC addresses of respective ports are not consecutive numbers, conversion is performed according to the regularity of the numbering of MAC addresses. A regulation of address conversion is stored in the address conversion unit 71 in advance.

The taking-out control unit 24 has a function to control each order buffer unit so that packets may be sent from each order buffer unit to the output buffer unit 23 in order of sequence number. The taking-out control unit 24 refers to the sequence numbers of packets stored in the heads of the first order buffer unit 25 and the second order buffer unit 26, and controls so that the packets may be outputted to the output buffer unit 23. When a packet of a number next to the sequence number of a packet for which output has finished does not exist in the first order buffer unit 25 and the second order buffer unit 26, the taking-out control unit 24 sends information which shows that output of packets has been completed to the lack detection unit 29 as a completion notification.

The first order buffer unit 25 has a function to determine whether the data of a packet received from the transmitting device 10 via the network 30 is needed to be stored or not and store it temporarily. The first order buffer unit 25 also has a function to conduct outputting to the output buffer unit 23 based on control of the taking-out control unit 24. When the data of a packet, which has been received via the network 30, is received from the first port 51, the first order buffer unit 25 stores the received data. When the data of the packet is stored, the first order buffer unit 25 sends information which shows that a packet has been stored to the taking-out control unit 24 as a storing completion notification.

When the packet is stored, the first order buffer unit 25 compares the sequence number of the packet which has been received newly and the sequence number of a packet which has been already stored. When the sequence number of the packet received newly is smaller than the sequence number that has been already stored, the first order buffer unit 25 determines that retransmission of a packet has occurred and disposes the data of the packet which has been already stored. When the sequence number of the packet received newly is larger than the sequence number that has been already stored, the data of the packet received newly is held.

The first order buffer unit 25 outputs data of a packet to the output buffer unit 23 in order of storage based on control of the taking-out control unit 24. That is, the first order buffer unit 25 functions as a FIFO buffer.

The second order buffer unit 26 has the same function as the first order buffer unit 25. When the data of a packet, which has been received via the network 30, is received from the second port 52, the second order buffer unit 26 stores the received data. When the data of the packet is stored, the second order buffer unit 26 sends information which shows that the packet has been stored to the taking-out control unit 24 as a storing completion notification.

When the packet is stored, the second order buffer unit 26 compares the sequence number of the packet which has been received newly and the sequence number of a packet which has been already stored. When the sequence number of the packet received newly is smaller than the sequence number that has been already stored, the second order buffer unit 26 determines that a retransmission of a packet has occurred, and disposes the data of the packet which has been already stored. When the sequence number of the packet received newly is larger than the sequence number that has been already stored, the data of the packet received newly is held. The second order buffer unit 26 outputs the data of a packet to the output buffer unit 23 in order of storage based on control of the taking-out control unit 24.

The first order buffer unit 25, the second order buffer unit 26 and the taking-out control unit 24 may be equipped with a function to measure a volume of data received from the transmitting device 10 by each port per unit time. When it is made to be a structure having the function to measure the data volume received from the transmitting device 10 by each port per the unit time, information on a data volume received per unit time is sent to the transmitting device 10 via each port in a predetermined time interval. The information on a volume of data received from the transmitting device 10 per unit time is used when information on a network band is generated in the transmitting device 10.

The broadcast transmission unit 27 has a function to transmit information on a MAC address of each port of the receiving device 20 by a broadcast via the network 30. The broadcast transmission unit 27 controls the first port 51 and the second port 52 to transmit information on the respective MAC addresses to the network 30 by a broadcast. The broadcast transmission unit 27 transmits information on a MAC address in a predetermined time intervals. The predetermined time is set in advance.

The ACK transmission unit 28 has a function to send a notification of a retransmission request or transmittal confirmation to the transmitting device 10. When the sequence number of a packet outputted to the output buffer unit 23 is received from the taking-out control unit 24, the ACK transmission unit 28 transmits a notification of transmittal confirmation including the sequence number that has been received to the transmitting device 10 as an ACK packet via the first port 51 or the second port 52. The ACK transmission unit 28 selects one of the first port 51 and the second port 52 to transmit the ACK packet. For example, the ACK transmission unit 28 selects a port in the side where reception of a packet is being carried out to transmit the ACK packet. The ACK transmission unit 28 may select, between the first port 51 and the second port 52 operating normally, one port in the side where data communication is not being carried out to transmit an ACK packet. The notification of transmittal confirmation may be performed every one packet, or may be performed for every predetermined number of packets. An interval to transmit a notification of transmittal confirmation as an ACK packet is set in advance.

When the sequence number of a packet for which a lack has been detected is received from the lack detection unit 29, the ACK transmission unit 28 selects any one of the first port 51 and the second port 52 and transmits a retransmission request including the sequence number that has been received to the transmitting device 10. The ACK transmission unit 28 selects a port for transmission just like a case of transmitting a notification of transmittal confirmation.

The lack detection unit 29 has a function to detect a lack of a packet outputted to the output buffer unit 23. The lack detection unit 29 monitors the sequence numbers of packets outputted to the output buffer unit 23, and, when a lack of a number is caused, determines that a packet is lacking. When it is determined that a packet is lacking, the lack detection unit 29 transmits a retransmission request for the lacking sequence number and the packet to the ACK transmission unit 28.

The first port 51 has a function to communicate with the transmitting device 10 via the network 30. The first port 51 converts data received via the network 30 into a signal of a form used inside the receiving device 20, and sends it to the first order buffer unit 25.

The second port 52 has a function to communicate with the transmitting device 10 via the network 30. The second port 52 converts data received via the network 30 into a signal of the form used inside the receiving device 20, and sends it to the second order buffer unit 26.

Furthermore, the first port 51 and the second port 52 transmit a broadcast packet, ACK packets of transmittal confirmation, retransmission request and the like to be sent to the transmitting device 10 to the network 30. The first port 51 and the second port 52 of this exemplary embodiment have MAC addresses of continuous numbers, respectively. The MAC addresses of the first port 51 and the second port 52 do not have to be continuous numbers. When it is not continuous numbers, it is desirable that there be regularity in the MAC addresses of the first port 51 and the second port 52.

The first port 41 and the second port 42 of the transmitting device 10 and the first port 51 and the second port 52 of the receiving device 20 are constituted as communication modules which send and receive a packet. Each port converts the data of a packet sent from the interior of its own device to a signal based on the communication standard, and transmits it to the network 30. Also, each port converts a received signal from the network 30 into a data format used in its own device, and sends it to each part of its own device.

Each part besides the first port 41 and the second port 42 of the transmitting device 10 and the first port 51 and the second port 52 of the receiving device 20 can be configured by electronic circuits that use a plurality of semiconductor devices or a single semiconductor device, respectively. A plurality of parts may be formed in one semiconductor device or a package.

The network 30 is constituted as a single communication network by which the transmitting device 10 and the receiving device 20 can send and receive data to and from each other via a plurality of communication routes. In the network 30 that is a single communication network, a plurality of communication routes are formed by a plurality of communication lines connected to each other between the transmitting device 10 and the receiving device 20. The network 30 of this exemplary embodiment is constituted as Ethernet (registered trademark). There is provided a communication device such as a switching hub on each communication route of the network 30.

Operations of a communication system of this exemplary embodiment will be described. First, operations of the transmitting device 10 when it collects information on a MAC address of each port of the receiving device 20 of a connection destination will be described.

The broadcast transmission unit 27 of the receiving device 20 generates a packet for transmitting information on a MAC address of each port of its own device to the transmitting device 10 at the time of start-up of the own device and in a predetermined time interval. In this exemplary embodiment, a packet for transmitting information on a MAC address of each port is called a broadcast packet. A broadcast packet includes information which shows that it is a broadcast and a MAC address of a port to be a source.

When a broadcast packet is generated, the broadcast transmission unit 27 transmits broadcast packets to the network 30 from the first port 51 and the second port 52, respectively.

The broadcast packets transmitted from the first port 51 and the second port 52 of the receiving device 20 are transmitted to the network 30, and sent to each port connected to the network 30, respectively. When the first port 51 and the second port 52 of the receiving device 20 receive a broadcast packet transmitted from its own device, they discard the received packet because a MAC address of a port of its own device is described as the MAC address of the source.

When a broadcast packet is received from the receiving device 20 via the network 30, the first port 41 of the transmitting device 10 sends the data of the broadcast packet which has been received to the route status monitoring unit 16. When the data of the broadcast packet is received from the first port 41, the route status monitoring unit 16 correlates the information on the MAC address of the source to the first port 41, and stores the information in a routing information table.

Similarly, when a broadcast packet is received, the second port 42 of the transmitting device 10 sends the data of the broadcast packet which has been received to the route status monitoring unit 16. When the data of the broadband packet is received from the second port 42, the route status monitoring unit 16 correlates the information on the MAC address of the source to the second port 42, and stores the information in the routing information table. When routing information is stored in the routing information table, the transmitting device 10 communicates with the receiving device 20 based on the routing information of the routing information table.

Figure 5:
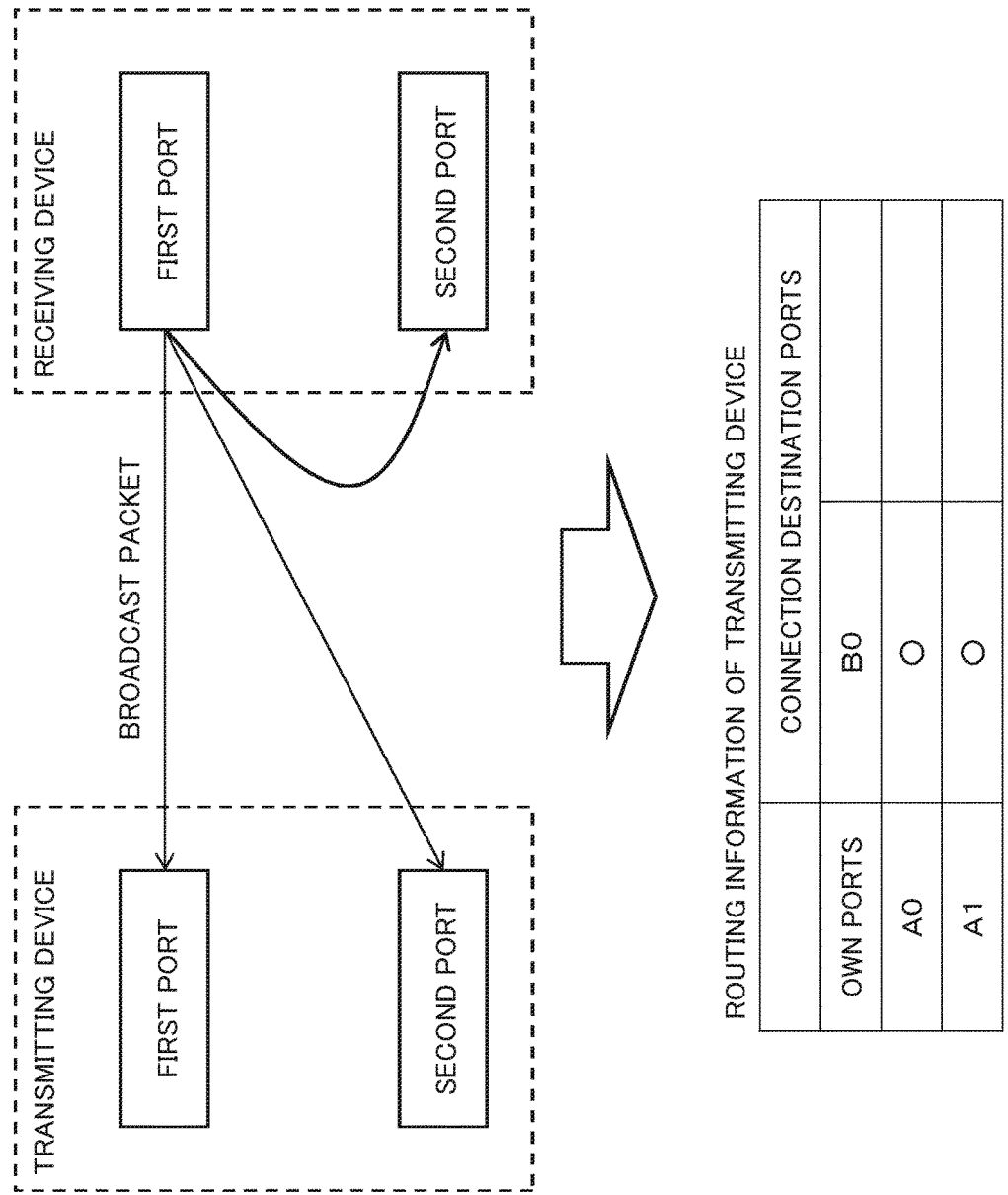
FIG. 5 is a diagram showing an example of routing information in the second exemplary embodiment of the present invention.
Figure 6:
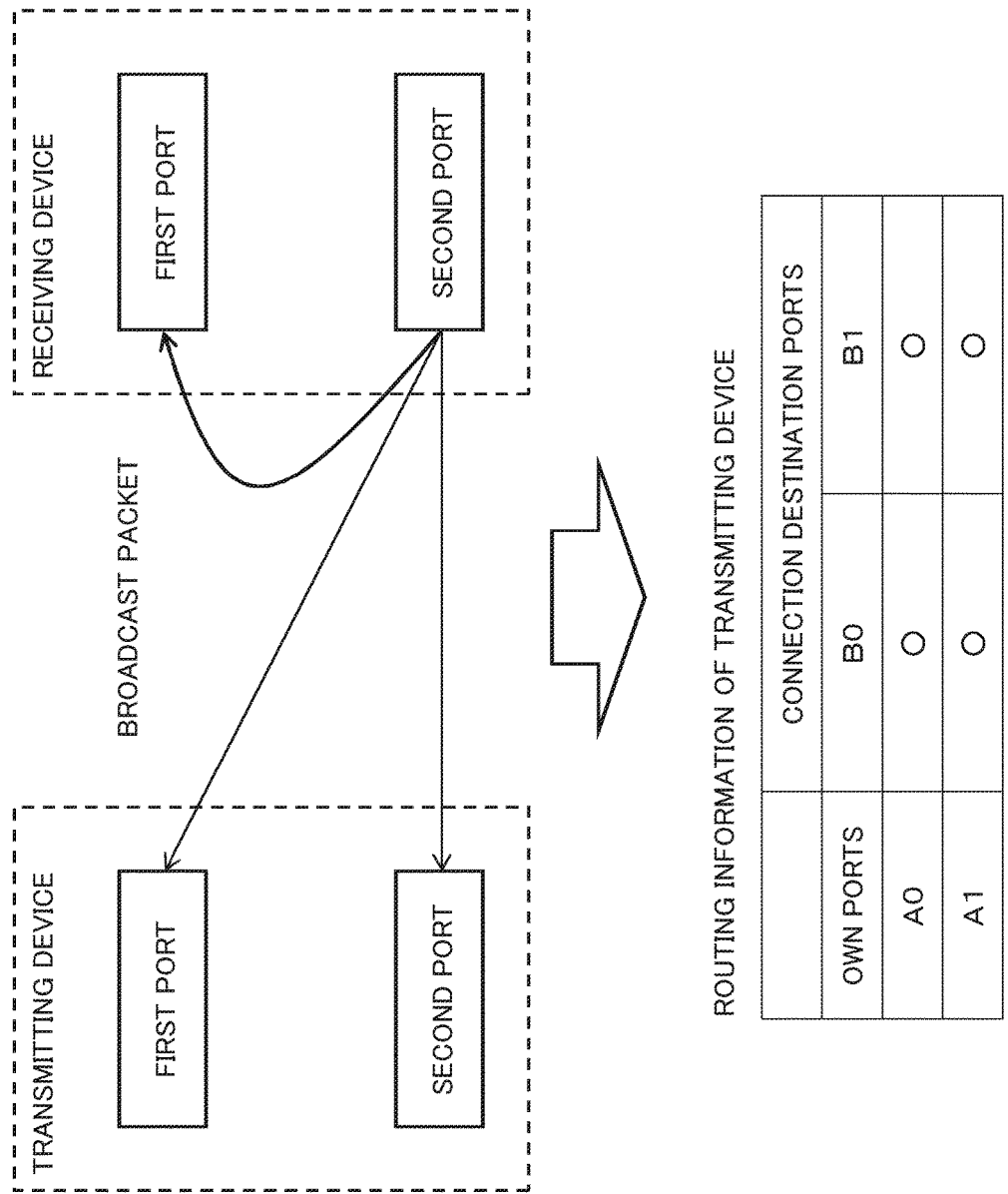
FIG. 6 is a diagram showing an example of routing information in the second exemplary embodiment of the present invention
Figure 7:
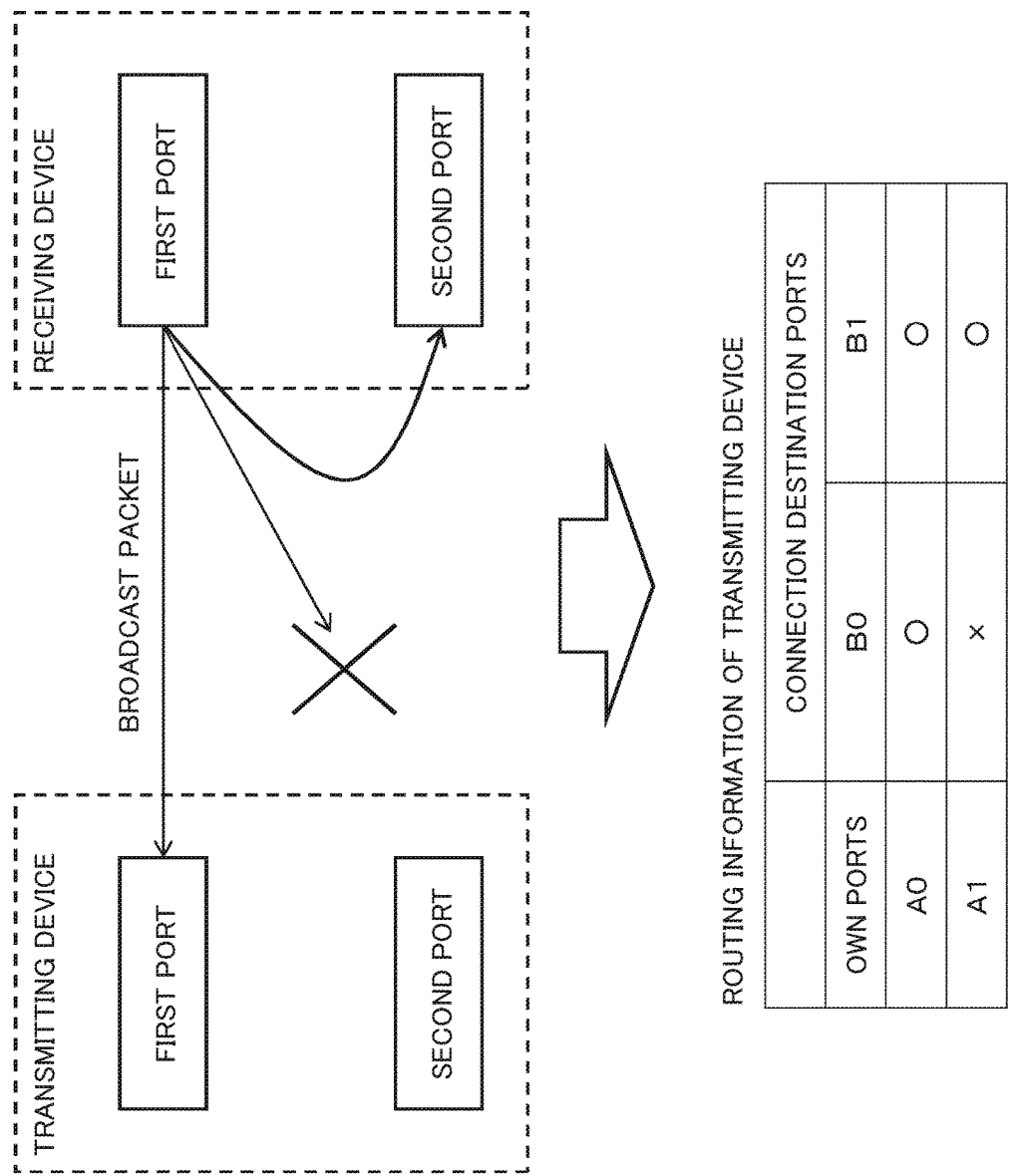
FIG. 7 is a diagram showing an example of routing information in the second exemplary embodiment of the present invention.

A specific example of a routing information table generated in the transmitting device 10 of a communication system of this exemplary embodiment will be described. FIG. 5, FIG. 6 and FIG. 7 indicate examples of routing information generated in a communication system of this exemplary embodiment schematically. In FIG. 5, FIG. 6 and FIG. 7, it is supposed that the MAC address of the first port 41 of the transmitting device 10 is set as "A0", and the MAC address of the second port 42 as "A1", respectively. It is also supposed that the MAC address of the first port 51 of the receiving device 20 is set as "B0", and the MAC address of the second port 52 as "B1", respectively.

The diagram of the upper part of FIG. 5 indicates an example in which a broadcast packet has been transmitted from the first port 51 of the receiving device 20. In the diagram of the upper part of FIG. 5, a broadcast packet transmitted from the first port 51 of the receiving device 20 is sent to the second port 42 of the receiving device 20 as well as the first port 41 and the second port 52 of the transmitting device 10, respectively. At that time, the first port 41 of the MAC address "A0" and the second port 42 of the MAC address "A1" in the transmitting device 10 have received the packet from the MAC address "B0". Therefore, in the table of routing information which indicates routing information of the transmitting device 10 shown in the lower part of FIG. 5, a route between "A0" and "B0" and a route between "A1" and "B0" are set as "o" which shows that a route in question can be used.

The diagram of the upper part of FIG. 6 indicates an example in which a broadcast packet has been transmitted further from the second port 52 of the receiving device 20 following the state of FIG. 5. In the diagram of the upper part of FIG. 6, the broadcast packet transmitted from the second port 52 of the receiving device 20 is sent to the first port 51 of the receiving device 20 as well as the first port 41 and the second port 42 of the transmitting device 10, respectively. At that time, the first port 41 of the MAC address "A0" and the second port 42 of the MAC address "A1" in the transmitting device 10 have received the packet from the MAC address "B1". Therefore, in the routing information table showing routing information of the transmitting device 10 indicated in the lower part of FIG. 6, the route between "A0" and "B1" and the route between "A1" and "B1" are set as "o" which shows that a route in question can be used, in addition to the routes between "A0" and "B0" and between "A1" and "B0".

The diagram of the upper part of FIG. 7 indicates an example in which a broadcast packet has been transmitted further from the first port 51 of the receiving device 20 following the state of FIG. 6. In the diagram of the upper part of FIG. 7, the broadcast packet transmitted from the first port 51 of the receiving device 20 is sent to the second port 52 of the receiving device 20 as well as the first port 41 of the transmitting device 10, respectively. However, the broadband packet has not been sent to the second port 42 of the transmitting device 10 due to a failure or the like. Therefore, in the table of routing information which indicates routing information of the transmitting device 10 shown in the lower part of FIG. 7, the route between "A1" and "B0" is set as "x" which shows that it is unusable. The transmitting device 10 determines whether a communication route is usable or not based on routing information of the routing information table generated as mentioned above to perform communication with the receiving device 20.

Figure 8:
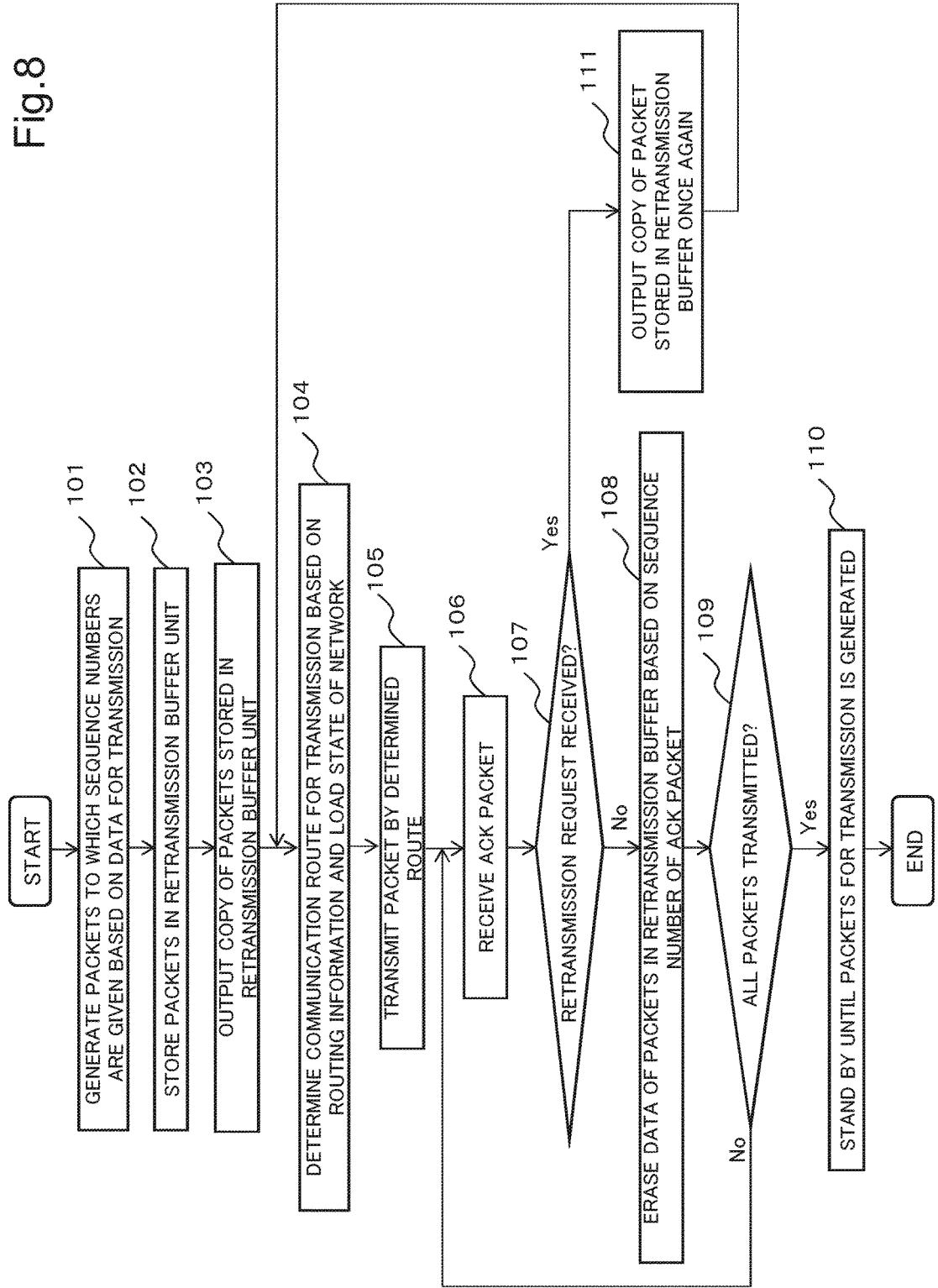
FIG. 8 is a diagram showing an operation flow of a transmitting device of the second exemplary embodiment of the present invention.
Figure 9:
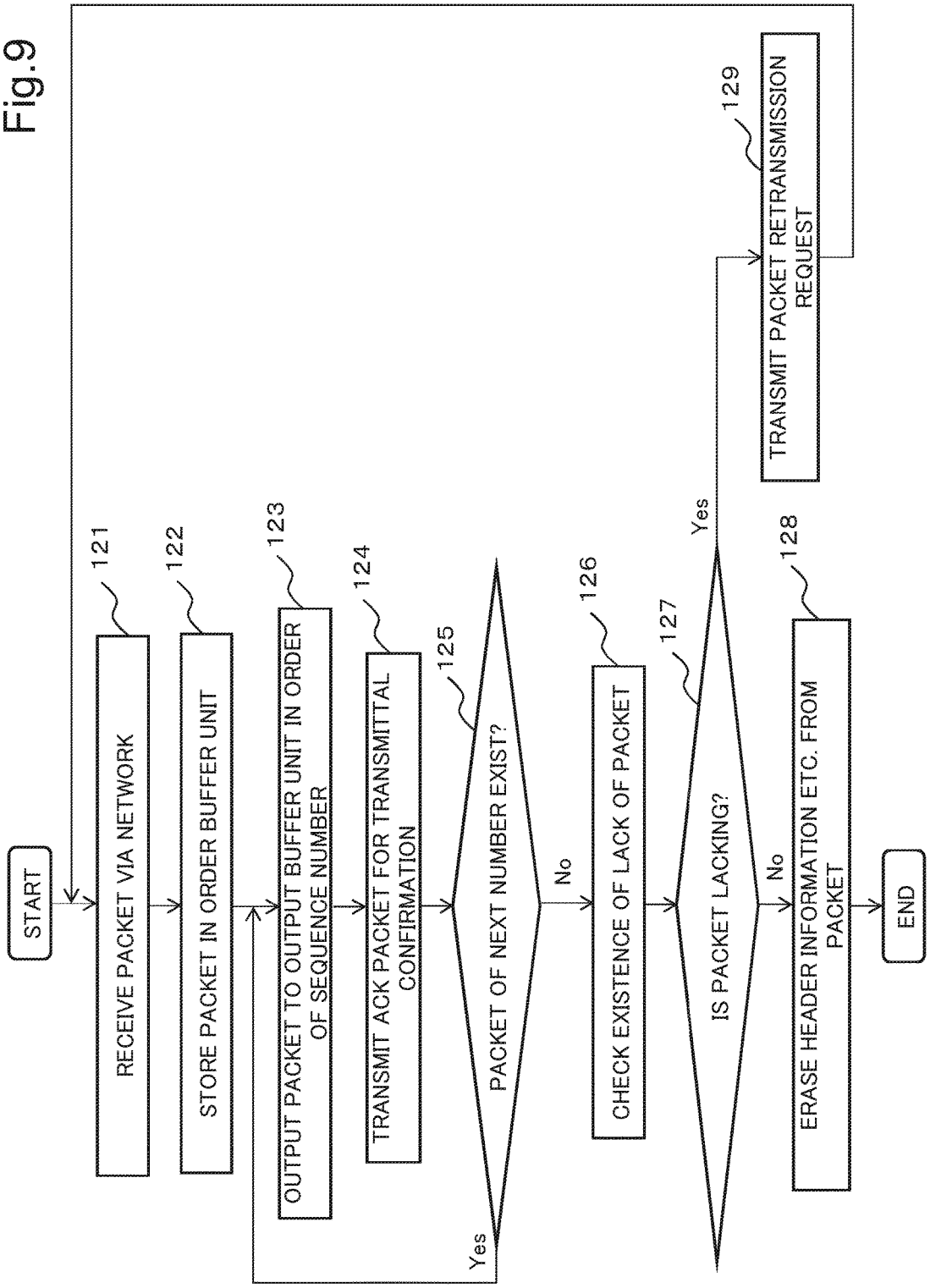
FIG. 9 is a diagram showing an operation flow of a receiving device of the second exemplary embodiment of the present invention.

Next, operations when the transmitting device 10 transmits data to the receiving device 20 via the network 30 will be described with reference to FIG. 8 and FIG. 9. FIG. 8 indicates an outline of an operation flow when the transmitting device 10 transmits data. FIG. 9 indicates an outline of an operation flow when the receiving device 20 performs data reception.

First, operations when the transmitting device 10 transmits data will be described with reference to FIG. 8. The data transmission unit 11 of the transmitting device 10 generates data to be transmitted to the receiving device 20 based on a processing result or the like of an application program. When data to be transmitted to the receiving device 20 is generated, the data transmission unit 11 sends the generated data to the SEQ giving unit 12.

When the data to be sent to the receiving device 20 is received, the SEQ giving unit 12 divides the received data into pieces of data of a predetermined data volume to generate packets. A predetermined data volume is set based on a data volume of a packet transmitted by the network 30. When data of packets is generated by such division, the SEQ giving unit 12 adds, based on the alignment sequence of the data before division, address information and a sequence number to the data of each packet generated in a divided manner to generate packets for transmission (Step 101).

When a sequence number or the like is added, the SEQ giving unit 12 sends the packets to the retransmission buffer unit 13 in order of sequence number. The retransmission buffer unit 13 receives the data of the packets and stores it in order of reception (Step 102).

When the data of the packet is stored, the retransmission buffer unit 13 outputs a copy of the data of a packet to the communication control unit 15 in order of storage. In this exemplary embodiment, the retransmission buffer unit 13 outputs a copy of the data of a packet to the communication control unit 15 in a fixed time interval (Step 103). A fixed time which is an interval to output a copy of the data of a packet is set in advance based on a time period which a transmission processing of a packet takes. When a copy of the data of a packet is outputted to the communication control unit 15, the retransmission buffer unit 13 makes the retransmission timer unit 14 operate.

When the data of the packet to be sent to the receiving device 20 is received, the communication control unit 15 refers to a routing information table generated by the route status monitoring unit 16 and information on a load state generated by the band monitoring unit 17 to determine a communication route to be used for transmission (Step 104). The communication control unit 15 selects a port corresponding to the communication route having the largest surplus network band as a port to be used for transmission among usable communication routes.

When a port used for transmission is selected, the communication control unit 15 converts information on the address of the packet into the MAC address of a port of the receiving device 20 that is the destination and information on the MAC address of a port of its own device to be a source. The MAC address of a port of the receiving device 20 of the destination is added with reference to a routing information table. When information on the MAC address of the packet is converted, the communication control unit 15 transmits the packet to the selected port. The first port 41 or the second port 42 corresponding to the communication route determined in Step 104 receives the packet and transmits the received packet to the network 30 (Step 105).

Next, operations when the receiving device 20 receives data will be described with reference to FIG. 9. The packet transmitted from the transmitting device 10 is received at a port of the receiving device 20 designated by the MAC address of the destination (Step 121). Here, for example, it is supposed that the packet has been received by the first port 51. When the packet for which its own MAC address is designated is received, the first port 51 sends the received packet to the first order buffer unit 25. The first order buffer unit 25 receives the packet, and stores it in order of reception of packets (Step 122). When the packet is stored, the first order buffer unit 25 sends information which shows that a packet has been stored to the taking-out control unit 24 as a storing completion notification. Similarly, when the second port 52 and the second order buffer unit 26 receive a packet, they operate just like the first port 51 and the first order buffer unit 25.

When a storing completion notification is received, the taking-out control unit 24 checks the sequence number of the packet stored in the head of each order buffer unit. After having checked the sequence numbers, the taking-out control unit 24 sends to an order buffer unit storing a packet with the smallest sequence number among packets that have not been outputted to the output buffer unit 23 yet a control signal to output a packet to the output buffer unit 23.

When the control signal to output a packet is received, the first order buffer unit 25 or the second order buffer unit 26 sends a packet stored in the head to the output buffer unit 23 (Step 123). When the packet is outputted to the output buffer unit 23, the taking-out control unit 24 notifies the ACK transmission unit 28 of the sequence number of the packet having been outputted. The ACK transmission unit 28 receives the notification of the sequence number, and transmits a transmittal completion notification including the received sequence number to the transmitting device 10 as an ACK packet via the first port 51 or the second port 52 (Step 124).

When output of the packet of the smallest sequence number among the packets not having been outputted yet to the output buffer unit 23 has finished, the taking-out control unit 24 checks whether a packet with a sequence number that is larger than that of the packet which has been just outputted by one is stored in any of the order buffer units or not.

When there is a packet of a sequence number larger by one (in Step 125, Yes), returning to Step 123 is made, the taking-out control unit 24 sends to the order buffer unit storing the packet with the sequence number that is larger by one than that of the packet which has been just outputted a control signal to output a packet. The order buffer unit which has received the control signal to output a packet outputs the packet stored in the head to the output buffer unit 23.

When the packet is outputted to the output buffer unit 23, the taking-out control unit 24 notifies the ACK transmission unit 28 of the sequence number of the outputted packet. When the notification of the sequence number is received, the ACK transmission unit 28 transmits a transmittal completion notification including the received sequence number to the transmitting device 10 as an ACK packet via the first port 51 or the second port 52. When the packet is outputted to the output buffer unit, the above-mentioned operation is performed further repeatedly.

When there is no packet having a sequence number larger by one (in Step 125, No), the taking-out control unit 24 sends a completion notification which shows that output of received packets has been completed to the lack detection unit 29. When the completion notification is received, the lack detection unit 29 checks presence of a lack of a packet (Step 126).

When the operation to check presence of a lack of a packet is begun, the lack detection unit 29 checks whether data is stored in each order buffer unit or not. When data is not stored in the order buffer units, the lack detection unit 29 notifies the output buffer unit 23 of information which shows that reception of data has completed normally. A lack of a packet may be detected when discontinuity is observed in sequence numbers when referring to both the first port 51 and the second port 52.

When there is no lacking packet and reception of data is normally completed (in Step 127, No), the output buffer unit 23 sends stored packets to the SEQ deletion unit 22 in order of storage. On the occasion of outputting the packets, the output buffer unit 23 converts information on the addresses of the packets which are being stored. When a packet is received, the data receiving unit 21 eliminates the header information and the like from the packet which has been received, and sends it to the SEQ deletion unit 22 (Step 128). The data receiving unit 21 receives data of the packets successively, and performs processing and the like by an application program based on the data which has been received.

When a packet is lacking and discontinuity or the like of the sequence numbers is caused, and a packet remains in an order buffer unit (in Step 127, Yes), the output buffer unit 23 sends a retransmission request of the packet needed to be retransmitted to the ACK transmission unit 28 together with the sequence number of the packet. When the retransmission request is received, the ACK transmission unit 28 transmits the retransmission request to the transmitting device 10 via the first port 51 or the second port 52 (Step 129).

Next, with reference to FIG. 8 again, operations after the transmitting device 10 has received a transmittal confirmation packet or a retransmission request packet will be described. ACK packets which indicate information on a retransmission request and a transmittal completion notification transmitted from the ACK transmission unit 28 are received by the first port 41 or the second port 42 of the transmitting device 10 (Step 106). When information on a retransmission request or a transmittal completion notification is received, the first port 41 or the second port 42 sends the received information on a retransmission request or a transmittal completion notification to the retransmission buffer unit 13 via the communication control unit 15.

When the received information is not a retransmission request and is a transmittal completion notification (in Step 107, No), the retransmission buffer unit 13 erases the data of packets that have a sequence number that is equal to or smaller than the sequence number indicated in the transmittal completion notification among the data of packets being stored (Step 108). When the data of the packets is erased, the retransmission buffer unit 13 checks whether data of a packet is still being stored or not. When there is data of a packet (in Step 109, No), operations from Step 106 are performed repeatedly. When there is no data of a packet and transmission has been completed (in Step 109, Yes), the retransmission buffer unit 13 stands by until a packet for next transmissions is generated and inputted (Step 110).

When the received information is a retransmission request (in Step 107, Yes), the retransmission buffer unit 13 outputs a copy of data of packets having a sequence number that is equal to or larger than the sequence number indicated in the retransmission request among the data of packets being stored once again to the communication control unit 15 (Step 111). When the copy of the data of the packets in question is outputted to the communication control unit 15 once again, a return to Step 104 is made, and the communication control unit 15 determines a communication route to be used for transmission based on routing information and a load state, and transmits the data of the packets to the receiving device 20.

Figure 10:
FIG. 10 is a diagram showing an example of band information in the second exemplary embodiment of the present invention.

An example of band information generated by the band monitoring unit 17 of the transmitting device 10 of this exemplary embodiment by monitoring a load state of the network 30 will be described with reference to FIG. 10 and FIG. 11. FIG. 10 is a diagram which shows an example of band information indicating a load state in the communication route between the first port 41 of the MAC address "A0" in the transmitting device 10 and the first port 51 of the MAC address "B0" in the receiving device 20. In the upper part of FIG. 10, an example in which NW band which indicates the biggest network band which can be used for communication is 40 Gbps (Giga bit per second) and a transmission band which indicates a band being used is 10 Gbps. At that time, a surplus band will be 30 Gbps which is calculated by subtracting a value of the transmission band from the value of NW band. The diagram of the lower part of FIG. 10 indicates an example when a data transfer rate is increased from the state of the diagram of the upper part, and the transmission band is increased to 30 Gbps. In the example of the diagram of the lower part of FIG. 10, the surplus band is decreased to 10 Gbps because the transmission band has been increased.

Figure 11:
FIG. 11 is a diagram showing an example of band information in the second exemplary embodiment of the present invention.

FIG. 11 is a diagram showing an example of band information which indicates a load state in the communication route between the first port 41 of the MAC address "A0" in the transmitting device 10 and the first port 51 of the MAC address "B0" in the receiving device 20 just like FIG. 10. In the upper part of FIG. 11, there is indicated an example in which NW band is 40 Gbps and a transmission band is 10 Gbps. At that time, a surplus band will be 30 Gbps which is calculated by subtracting the value of the transmission band from the value of NW band. The diagram of the lower part of FIG. 11 indicates an example when a volume of data transmitted by the network 30 is increased from the state of the diagram of the upper part, causing more crowded state, and NW band that can be used decreases to 20 Gbps. In the example of the diagram of the lower part of FIG. 11, a surplus band also decreases to 10 Gbps because usable NW band has been decreased.

An example of a change in such as a surplus band due to a change in a communication route and a load state in a communication system of this exemplary embodiment will be described with reference to FIG. 12, FIG. 13 and FIG. 14. FIG. 12, FIG. 13 and FIG. 14 are figures which indicate examples of routing information possessed by the transmitting device 10 and band information indicating a load state, respectively. The diagram of the upper part of FIG. 12, FIG. 13 and FIG. 14 indicates routing information which is information on a communication route, and the diagram of the lower part indicates band information which is information on a load state.

The routing information in the upper part of FIG. 12 indicates the state that communication is possible by all combinations of a communication route of the first port 41 and the second port 42 of the transmitting device 10, and the first port 51 and the second port 52 of the receiving device 20. The band information in the lower part of FIG. 12 indicates a transmission band, NW band, and a surplus band in a communication route formed between each port, respectively. In the example of FIG. 12, a surplus band of a communication route between the first port 41 of the MAC address "A0" in the transmitting device 10 and the first port 51 of the MAC address "B0" in the receiving device 20 is the biggest. Therefore, the communication control unit 15 of the transmitting device 10 selects the communication route between the first port 41 of the transmitting device 10 and the first port 51 of the receiving device 20 to transmit a packet.

FIG. 13 indicates an example in which an abnormality has been detected in the communication route between the first port 41 of the MAC address "A0" in the transmitting device 10 and the second port 52 of the MAC address "B1" in the receiving device 20 in the state of FIG. 12, and the route is determined to be unusable. In FIG. 13, due to transmission of packets using the communication route between the first port 41 of the transmitting device 10 and the first port 51 of the receiving device 20 that has begun from the state of FIG. 12, increase in a transmission band and decrease in a surplus band of the communication route has been caused.

Detection of an abnormality of a communication route is performed by determining that an abnormality is caused in the communication route when the first port 41 of the transmitting device 10 cannot detect a broadcast packet from the second port 52 of the receiving device 20 for a predetermined time or more, for example. At that time, although the surplus band of the communication route between the first port 41 of the transmitting device 10 and the second port 52 of the receiving device 20 becomes the biggest, it cannot be selected because it is unusable. Therefore, the communication route between the second port 42 of the MAC address "A1" in the transmitting device 10 and the second port 52 of the MAC address "B1" in the receiving device 20, the route having the second largest value of a surplus band, is selected to transmit a packet.

FIG. 14 shows a change in a band when communication is performed by the communication route between the second port 42 of the transmitting device 10 and the second port 52 of the receiving device 20 in the FIG. 13. In FIG. 14, because communication for which the communication route between the first port 41 of the transmitting device 10 and the first port 51 of the receiving device 20 is selected has partially stopped, a transmission band of that route is decreased compared with that of FIG. 13. In addition, a transmission band of a communication route between the second port 42 of the transmitting device 10 and the second port 52 of the receiving device 20 selected newly is increased, and its surplus band is decreased. Thus, by selecting a communication route dynamically with reference to a surplus band to perform communication, delay and the like of transmission of a packet can be suppressed.

In a communication system of this exemplary embodiment, the route status monitoring unit 16 of the transmitting device 10 generates routing information which indicates information on a communication route based on information on a MAC address transmitted from the receiving device 20. When a failure and the like occurs in a communication route, it is possible to select another communication route to perform communication by the communication control unit 15 of the transmitting device 10 determining a communication route which is usable based on routing information.

In a communication system of this exemplary embodiment, the band monitoring unit 17 of the transmitting device 10 monitors a load state for each communication route, and the communication control unit 15 determines a communication route to send a packet based on a load state. By making the communication system be such structure, a communication route can be selected dynamically according to a load state, and a loss of a packet and delay of a transmission can be suppressed. Also, when another communication route is selected on the occasion of a failure and the like occurring in a communication route, it is possible to select, by referring to a load state, a communication route with which a loss of a packet and delay of a transmission is hard to be caused.

The receiving device 20 of a communication system of this exemplary embodiment stores packets received via each communication route in order buffers provided for each receiving port, and detects presence of a lack of a packet using the lack detection unit 29. Even in a case of communicating via a plurality of communication routes, a loss of a packet can be suppressed by requesting a retransmission of a packet which is lacking. The transmitting device 10 of a communication system of this exemplary embodiment can select a communication route once again on the occasion of retransmission of a packet based on routing information and a load state. Therefore, when a loss of a packet is caused due to occurrence of a failure or increase of a load, the packet can be transmitted more certainly from the transmitting device 10 to the receiving device 20 by selecting a communication route of a smaller load among communication routes which are usable to resend the packet. Therefore, reliability of communication is improved in a communication system of this exemplary embodiment. As above, in communication using a plurality of communication routes, a communication system of this exemplary embodiment is able to suppress a loss of a packet and delay of transmission while sharing a load.

Although a communication system of the second exemplary embodiment includes one piece of transmitting device 10 and one piece of receiving device 20, both of the transmitting device 10 and the receiving device 20 or either one of them may be provided in a plural manner. In a communication system of the second exemplary embodiment, although the transmitting device 10 and the receiving device 20 are connected by two ports to a network, respectively, no smaller than three ports may be provided in each device.

In a communication system of the second exemplary embodiment, although data is transmitted from the transmitting device 10 to the receiving device 20 side, data may be sent and received in both directions. When making a communication system be such structure, it can be configured using a communication device having the functions of the transmitting device 10 and the receiving device 20 together.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A communication device, comprising:
   a plurality of ports which send data to a single network including a plurality of communication routes and receive data from the single network; and
   at least one electronic circuit which generates information on the communication route based on correspondence of a first predetermined port among the plurality of ports and a second predetermined port among a plurality of ports provided in a communication device of a connection destination,
   monitors a load state for each of the communication routes, and
   selects the communication route to transmit a packet from the plurality of communication routes based on a monitoring result of the load state, add information on a media access control (MAC) address which is assigned each port from consecutive numbers or regularity numbers between ports, based on the selected communication route to the packet, and output the packet to the port corresponding to the selected communication route.

2. The communication device according to claim 1, the electronic circuit holds data of the packet for transmission and outputs a copy of the packet having been held, performs control, when a retransmission request of the packet is received from a communication device of a connection destination, so as to output the copy of the data of the packet held in the data holding unit once again.

3. The communication device according to claim 1, wherein, when the packet is retransmitted, the electronic circuit refers to a monitoring result of the load state once again to determine the port of an allocation destination of the packet.

4. The communication device according to claim 1, wherein the electronic circuit calculates a surplus band for each of the communication routes as the load state, and
allocates the packet to be transmitted to the port corresponding to the communication route having the surplus band that is largest.

5. The communication device according to claim 1, wherein,
the electronic circuit adds information on a MAC address which is assigned each port from consecutive numbers or regularity numbers between ports.

6. A communication system, comprising: a transmitting device comprising a communication device according to claim 1; and
a receiving device comprising a communication device comprising: at least one processor which sends and receives data via a plurality of ports connected to the single network; transmits information on a MAC address of the port to the network, and
the electronic circuit of the transmitting device generates information on the communication route based on the information on a MAC address transmitted from the receiving apparatus via the single network.

7. The communication system, comprising of claim 6, wherein,
the electronic circuit adds information on a MAC address which is assigned each port from consecutive numbers or regularity numbers between ports.

8. A communication method, comprising: generating, based on correspondence of a first predetermined port among a plurality of ports connected to a single network including a plurality of communication routes and a second predetermined port among a plurality of ports provided in a communication device of a connection destination, information on the plurality of communication route;
monitoring the load state for each of the plurality of communication routes;
selecting the communication route to transmit a packet from the plurality of communication routes based on a monitoring result of the load state, adding information on a MAC address which is assigned each port from consecutive numbers or regularity numbers between ports, based on the selected communication route to the packet, and outputting the packet to the port corresponding to the selected communication route; and
transmitting the packet from the port to the network.

9. The communication method of claim 8, further comprising:
holding data of the packet to be transmitted;
adding the information on a MAC address to a copy of the packet held to output the copy to the port; and
outputting the copy of the data of the held packet once again when a retransmission request of the held packet is received from a communication device of a connection destination.

10. The communication method of claim 8, wherein, when the packet is retransmitted, the communication route is selected referring to a monitoring result of the load state once again.

11. The communication method of claim 8, wherein a surplus band is calculated for each of the communication routes as the load state, and
wherein a communication route having the surplus band that is largest is selected as the communication route to transmit the packet.

12. The communication method of claim 8, wherein the information on a communication route is generated based on the information on a MAC address transmitted in via the network.

13. The communication method of claim 8, wherein,
adding information on a MAC address which is assigned each port from consecutive numbers or regularity numbers between ports.

* * * * *